United States Patent [19]

Albanese et al.

[11] 4,051,472
[45] Sept. 27, 1977

[54] LARGE AREA MOTION SENSOR USING PSEUDO-RANDOM CODING TECHNIQUE

[75] Inventors: Damian F. Albanese, Chatsworth; Richard R. Waer, Northridge, both of Calif.

[73] Assignee: International Telephone and Telegraph Corporation, New York, N.Y.

[21] Appl. No.: 646,289

[22] Filed: Jan. 2, 1976

Related U.S. Application Data

[63] Continuation of Ser. No. 458,808, April 8, 1974, abandoned.

[51] Int. Cl.² .................. G01S 9/42; G08B 13/22
[52] U.S. Cl. ....................... 343/5 PD; 340/258 A
[58] Field of Search ............. 343/5 PD; 340/258 A

[56] References Cited

U.S. PATENT DOCUMENTS

| | | | |
|---|---|---|---|
| 3,659,292 | 4/1972 | Martin et al. | 343/14 X |
| 3,754,254 | 8/1973 | Jinman | 343/5 PD X |
| 3,815,131 | 6/1974 | Dautel et al. | 343/5 PD |
| 3,882,493 | 5/1975 | Bolger | 340/258 A X |
| 3,882,494 | 5/1975 | Bolger | 343/5 PD |
| 3,932,871 | 1/1976 | Foote | 340/258 A X |
| 3,987,445 | 10/1976 | Fales | 340/258 A X |

Primary Examiner—Malcolm F. Hubler
Attorney, Agent, or Firm—William T. O'Neil

[57] ABSTRACT

A system primarily for industrial security; to detect intruder movement in interior areas. A Doppler detecting, bi-static system utilizing range (time-delay) areas of varying shapes. The detection containment obtained is orders of magnitude more absolute than conventional systems which depend on antenna beam shaping to obtain varying detection coverage. Range discrimination is effected by bi-phase modulating the transmitted CW radio frequency waves according to a maximal length pseudo-random code. The autocorrelation function provides the ideal range discrimination response for the application. Omni antenna coverages are provided and a lower rf band is used than in conventional systems for this use, affording lower moving clutter susceptibility and better coverage. The general pseudo-random coding techniques are available within the state of the Radar Arts.

8 Claims, 21 Drawing Figures

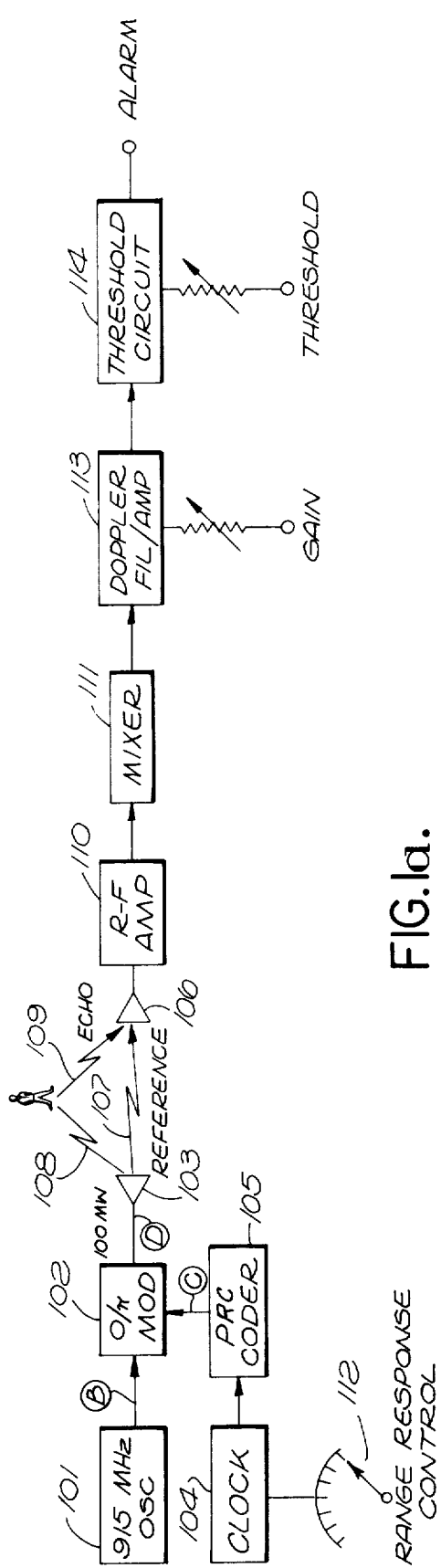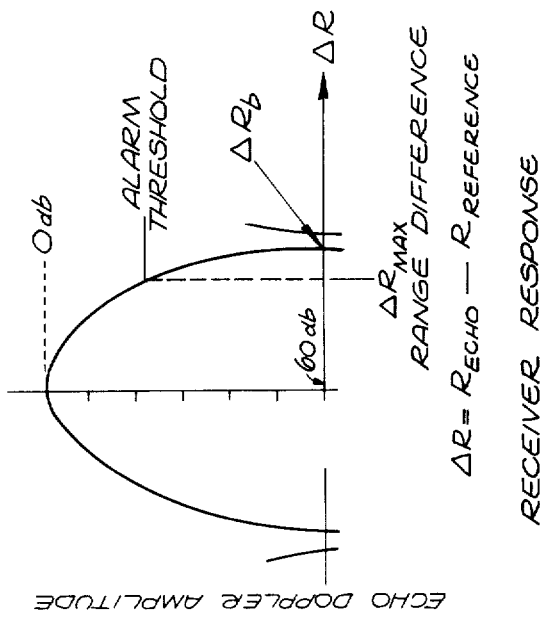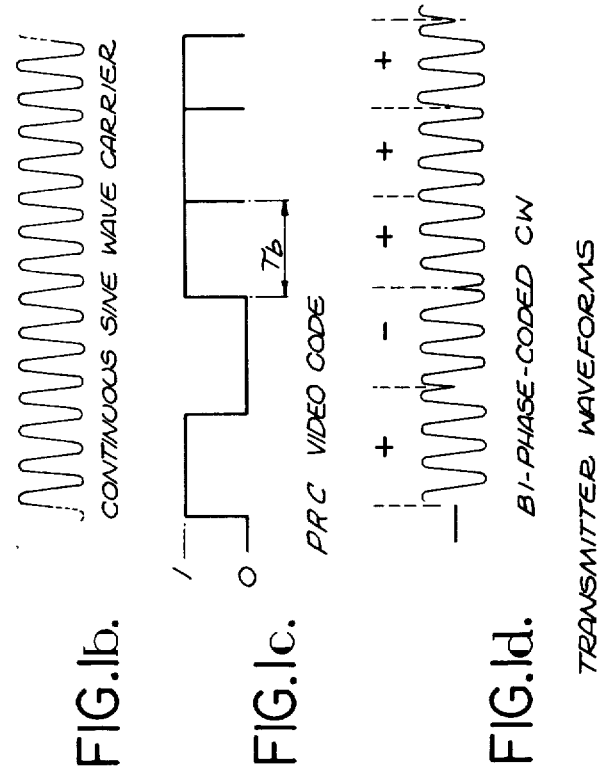
FIG.1a.
FIG.1e.
FIG.1b. CONTINUOUS SINE WAVE CARRIER
FIG.1c. PRC VIDEO CODE
FIG.1d. BI-PHASE-CODED CW
TRANSMITTER WAVEFORMS

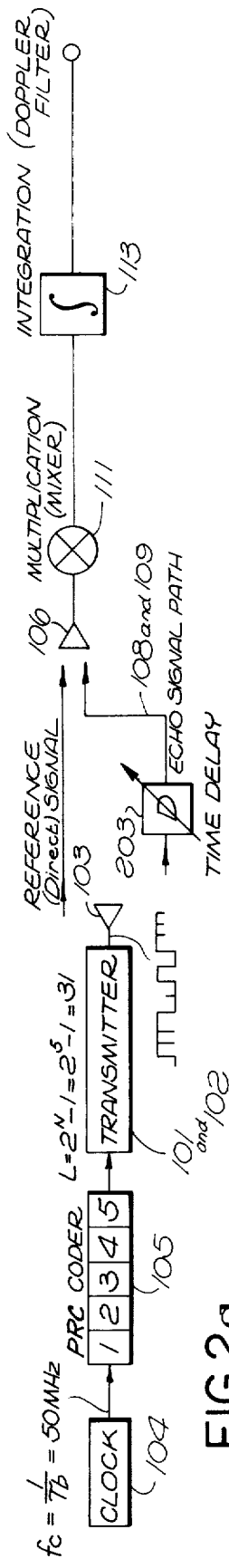
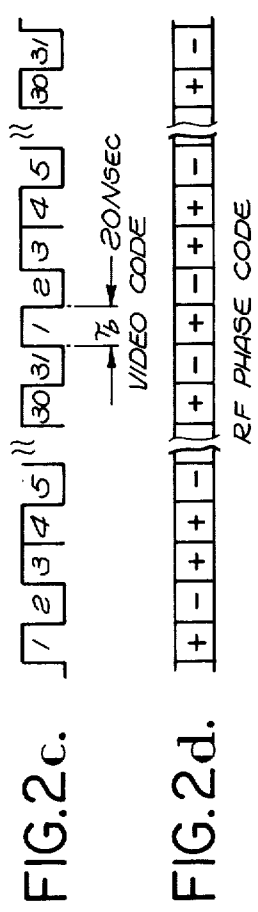
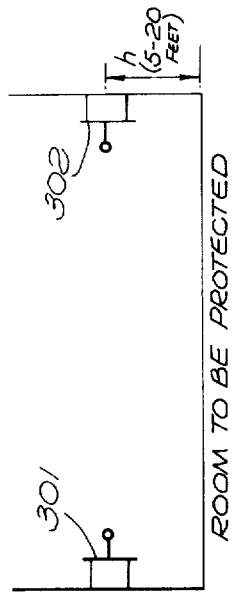
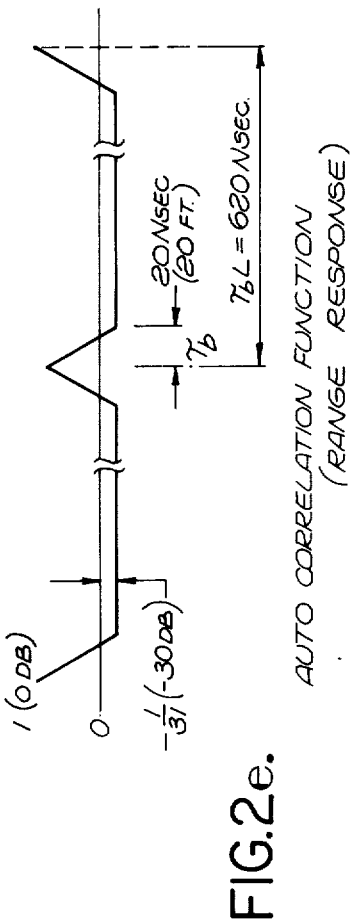

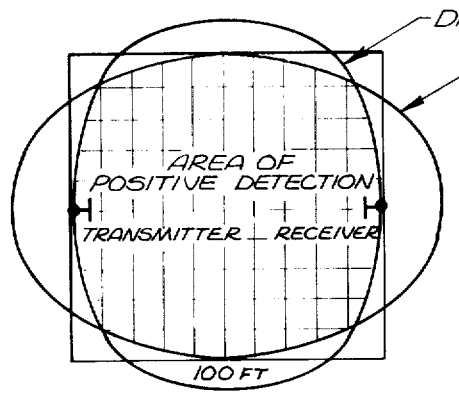
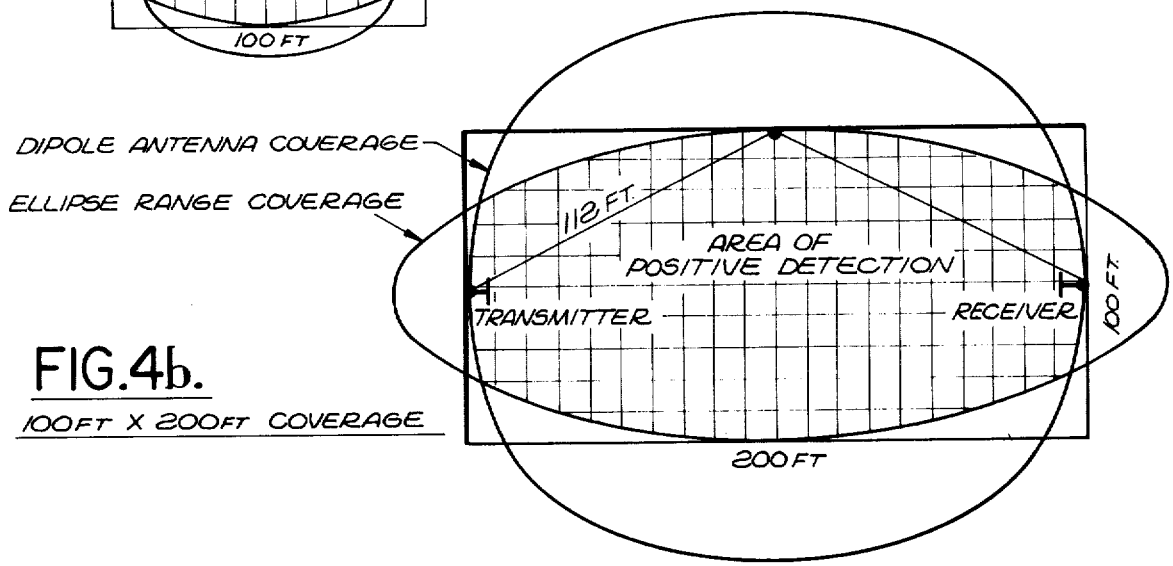
FIG.4a. 100FT x 100FT COVERAGE
FIG.4b. 100FT x 200FT COVERAGE
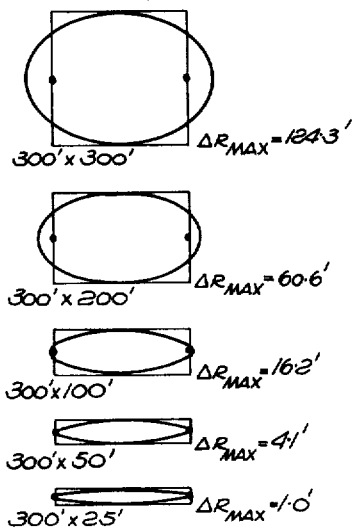
FIG.5a.
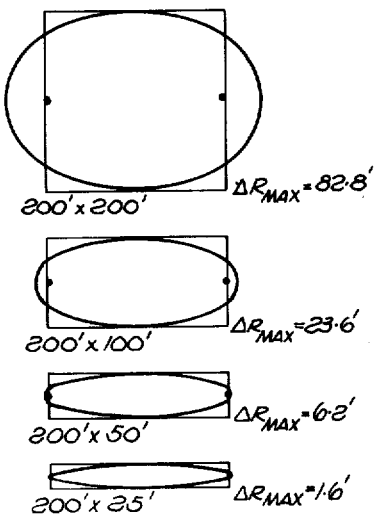
FIG.5b.
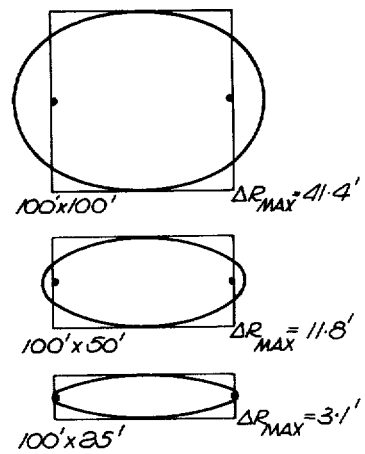
FIG.5c.

LARGE AREA MOTION SENSOR USING PSEUDO-RANDOM CODING TECHNIQUE

This is a continuation of U.S. application Ser. No. 458,808, filed Apr. 8, 1974, now abandoned.

BACKGROUND OF THE INVENTION

1. Field of the Invention

The invention relates generally to industrial security and more specifically to devices for the detection of intruders in interior areas.

2. Description of the Prior Art

In the prior art there have been various devices developed for detecting the entry of an intruder into a building, such devices frequently involve window and door security devices, or the like, which simply detect the entry of the intruder, but take no note of his presence once he is inside the secured area. Thus, if the intruder is able to deceive the entry detectors, he is relatively free to move about inside the supposedly secure area without detection.

Another class of conventional commercial radio frequency intrusion detection devices known in the prior art makes use of the Doppler principle to detect a moving intruder. In such systems an unmodulated radio frequency signal is transmitted (typically at a power level on the order of 30 MW and in the general frequency area of 10 GHz). The reflection from an intruder is mixed with a sample of the transmitted signal and the resultant Doppler is fed to a processor. The processor may simply be a filter and detector or a balance processor which attenuates moving clutter. Maximum Doppler shift at 10 GHz will range from 2 Hz to 400 Hz for target motions of 0.1 ft. per second to 20 ft. per second, respectively, and the minimum Doppler shift will be 0.

The required variations in coverage are generally obtained by changing antenna beam shape (to limit angle coverage) and by reducing transmitter power or receiver gain to limit the detection range.

Although the above described existing systems are relatively simple and inexpensive, they have important limitations with respect to large area motion detection.

The coverage requirement is generally for a rectangular area, and, since the area is illuminated by an antenna beam solid angle, the entire rectangular area is not uniformly covered. If the antenna angle is broadened to increase the coverage, then the beam is longer contained within the rectangle and detection outside the area of interest results. Furthermore, there is no sharp detection cutoff at the edges of the beam as a function of distance, for example, if the system is set up such that a human target is reliably detected at maximum range, a target which is 12db stronger (e.g., a large moving truck) will be seen at twice the maximum range. Targets that are larger than the human intruder, but not as large as the moving truck, will be detected at ranges between the desired maximum range and twice the desired maximum range. Thus, there is no positive containment at the rectangle edges and the system is susceptible to false alarms. Most of the commerical systems presently extant operate at higher microwave frequencies (typically 10 GHz), and require several antenna installations to cover the area of interest. This increases the cost and complexity. The higher microwave frequencies generally used are selected in preference to lower frequencies so that antenna arrays are of very moderate size. The choice of a 10 GHz operating frequency, rather than a lower frequency on the order of 1 GHz, has certain disadvantages however; among them being the fact that a human target radio echo is several decibels lower at the higher frequency than at the lower frequency. Moreover, at the higher frequency, the problem of shadowing in signal attenuation within the building due to obstructions such as cargo, shelves, walls, etc., is much more severe. Still further, typical target Doppler frequencies fall between 2 Hz and 400 Hz when the 10 GHz frequency is used, and therefore, the signals to which the system must repond occupy a requency band which also contains the ordinarily used power sources of 60 Hz and 400 Hz.

The general techniques of pseudo-random coded sequence (sometimes referred to as a pseudo-noise sequence) radar employed in the combination of the invention are variously described in the technical literature. For exmaple, the text "Radar Handbook", by Merrill Skolnik (McGraw Hill, 1970) describes with bibliographic references, the biphase coded sequences required. See Chapter 20, Sec. 20.5 of that text. Additional description for an understanding of pseudo-noise techniques is also found in two other texts, namely; "Radar Design Principles", by F. Nathanson, (Chapter 12, Page 452) and "Modern Radar", by R. S. Borkowitz, (Chapter 4, Page 247).

SUMMARY

In consideration of the state of the prior art and its disadvantages, it may be said to be the general object of the present invention to provide a large area motion sensor which can be adapted to varying rectangular shapes and sizes, and which insures positive detection containment.

The system employs a Doppler detecting, bi-static system which utilizes range (time delay) discrimination to obtain positive detection containment over rectangular areas of varying shapes. The detection containment obtained is orders of magnitude more absolute than can be achieved with conventional systems which depend on antenna beam shaping to obtain varying detection coverage.

The range discrimination is effected by bi-phase modulating the transmitted continuous-wave RF according to a pseudo-random (maximal length) coded sequence. The pseudo-random code autocorrelation function provides a system range discrimination response which is ideally suited to the detection system according to the invention.

In addition to containment of the detection area, additional benefits are obtained from use of the system of the present invention. For one example of such a dividend the pseudo-random coding affords a major improvement in jamming immunity and in immunity to interference, vis-a-vis a conventional CW system.

Since antenna shaping is not required by the sytem of the invention, a relatively low radio frequency and simple antennas may be utilized. For example, in one application 915 MHz was selected. This lower radio frequency has the advantage of providing less shadowing and attenuation within the area being covered, and more importantly, provides several orders of magnitude less susceptibility to moving clutter than obtains in a conventional prior art type system operating in the 10 GHz region. Accordingly, the fasle alarm probability is significantly reduced and the processing circuitry is correspondingly simplified.

A transmitting antenna which radiates the pseudo-random coded power is located in the vicinity in one end of a rectangular (for exmple) area and the receiving antenna is located similarly at an opposite end of the said rectangular area. Both antennas are substantially omni-directional and may be simple dipoles. Transmitted power may be held low, on the order of 100 milliwatts, for example.

The device operates by receiving the encoded transmitted energy by a direct path and by multiple reflection paths. A correlation among the direct path energy received and signals "bounced" from walls, ceilings, floors and objects within the area of surveillance is effected.

Correlation, detection and filtering are employed in a manner not unlike that provided in Doppler-type pseudo-random coded radar systems. The use of a Doppler filter affords the means by which the system can recognize intruders based on their motion, and the corresponding Doppler component which they produce.

The limits of the detection coverage area lie within an ellipse surrounding the transmitting and receiving antenna, said antennas each occupying the location of one of the foci of said ellipse.

The details of the manner in which the object of the invention is accomplished will be evident hereinafter in connection with description of the preferred embodiment.

BRIEF DESCRIPTION OF THE DRAWINGS

FIG. 1a is a block diagram of a system in accordance with the present invention.

FIG. 1b, 1c and 1d depict transmitted related waveforms applicable to the system in FIG. 1a.

FIG. 1e shows a typical receiver response curve for a system in accordance with the invention.

FIG. 2a depicts a transmitting and receiving systems in accordance with the present invention with more details of the transmitter coding and receiver correlation aspects.

FIG. 2b represents the clock pulses of the system.

FIG. 2c represents the video envelope of the bi-static phase or pseudo-random coding of the transmitter.

FIG. 2d represents the RF phase code corresponding to FIG. 2c.

FIG. 2e depicts the autocorrelation function of a typical system in accordance with the invention.

FIG. 3a represents a plan view of transmitting and receiving equipment placement in a rectangular area.

FIG. 3b depicts a typical elevation arrangement corresponding to FIG. 3a.

FIGS. 4a and 4b depict typical detection area geometries for square and rectangular areas of coverage, respectively.

FIGS. 5a, 5b and 5c depict a number of alternative surveillance areas in the corresponding typcial area of detection for each.

DESCRIPTION OF THE PREFERRED EMOBODIMENT

Figure 6:
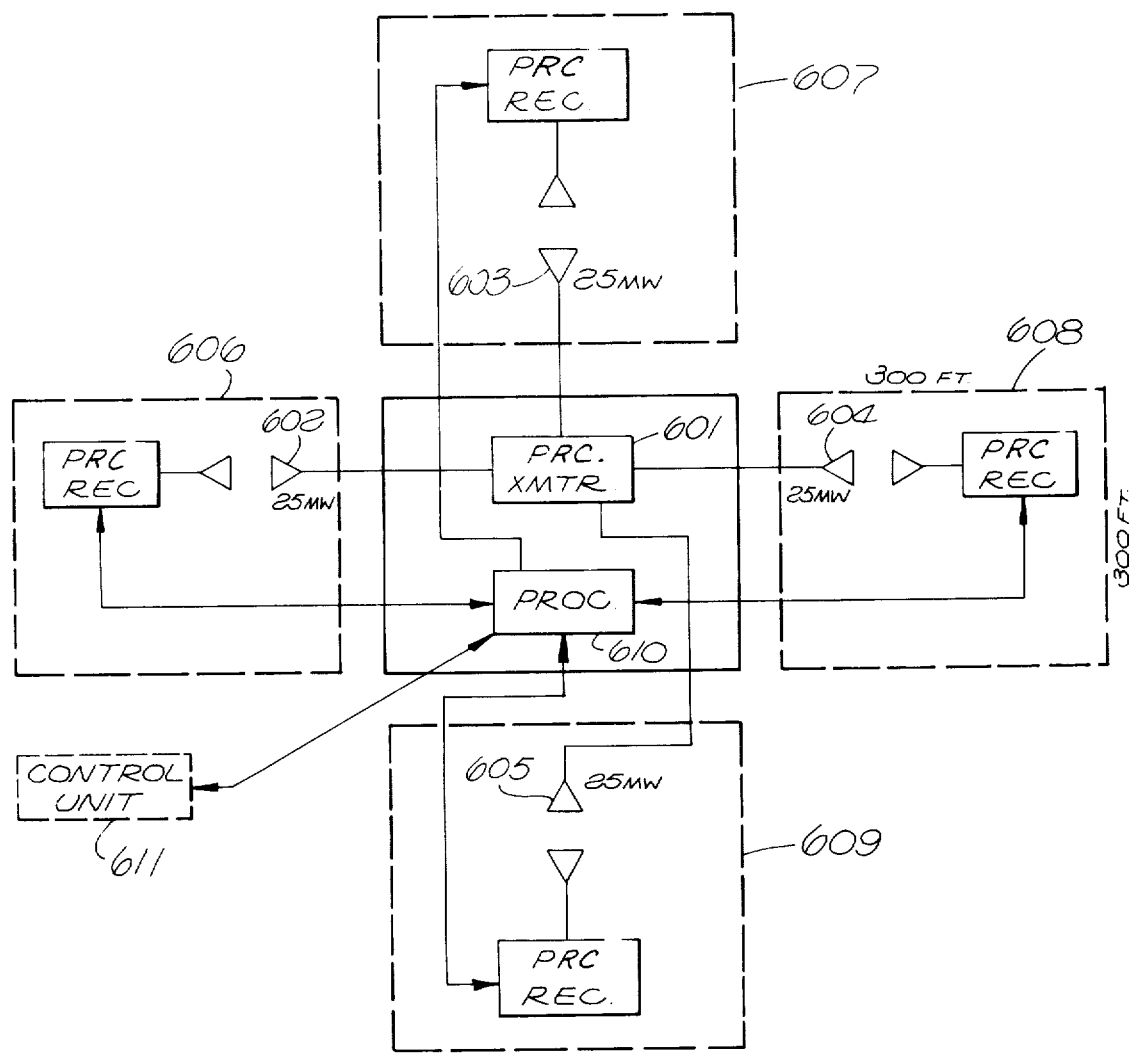
FIG. 6 depicts an alternative configuration according to the invention for the coverage of up to four contiguous separate areas.

A typical system for the coverage of a surveillance area of 300 ft. by 300 ft. (90,000 sq. ft.) with a single transmitter and receiver will be described, although additional illustrations, references and description are provided in respect to other areas and multiple areas to depict the generality and versatility of the device of the invention.

Since the present system does not require antenna beam shaping, a comparatively low transmitting carrier frequency is practical and 915 MHz was selected as a typical and satisfactory frequency of operation for a typical embodiment according to this description. This relatively low radio frequency has the advantage of providing less shadowing and attenuation in the area being covered, and also has a moving clutter susceptibility advantage as hereinbefore pointed out.

Adaptation to various rectangular shapes is accomplished by a simple control over the pseudo-random sequence clock rate, an adjustment which changes the system range response. Simple dipole antennas for transmitting and receiving and a maximum power on the order of 100 milliwatts are all the antenna structure necessary for satisfactory operation of the system of the invention. Accordingly, radio frequency sections of the system may be fabricated in low-cost mass produced microstrip (on alumina substrate for example) and the electronics other than the radio frequency elements may be fabricated using standard printed circuit card techniques. Thus, the system of the invention is highly reliable and is low-cost, both from manufacturing, maintenance, installation and operating points of view.

In a practical system, the motion to be detected may vary from something as low as 0.1 ft. per second to 20 ft. per second.

The system is relatively insensitive to stationary clutter, such as stored equipment or cargo, and moving clutter, such as represented by fans, airconditioning equipment and incidental vibration of the detection equipment and the storage area in general.

The additional advantage of the relatively low radio frequency selection is the minimizing of shadowing and attenuation caused by stationary clutter within the area of surveillance. The difficulty of containing a relatively low radio frequency within building walls is handled by the inherent range limitation placed on the system through the nature of the pseudo-random sequence encoded transmission and autocorrelating detection arrangement. It will be seen as this description proceeds, that the system provides a very high degree of detection containment within the ellipse surrounding the transmitter and receiver; the said transmitter and receiver each occupying a focus of the ellipse.

Referring now to FIGS. 1a through 1d, the basic configuration of the system according to the invention will be described.

A radio frequency oscillator 101, a bi-phase modulator 102 and antenna 103 comprise the transmitting components, per se.

A clock pluse generator 104 provides a continuous train of equally spaced narrow pulses having a repetition interval $Y_b$ (the bit duration).

A pseudo-random sequence coder 105, having for example, 10 stages, provides a series of "one" or "zero" pulses (plus or minus phase coded); such a waveform being depicted in FIG. 1c. Each of the successive phase code intervals in the video domain waveform of FIG. 1c is $Y_b$ in duration. It is the function of the bi-phase coder 102 to respond to this waveform signal C on FIG. 1, and to correspondingly phase modulate the CW carrier of waveform B of (FIG. 1b) to produce and supply a phase-modulated carrier at D of FIG. 1a to transmitting antenna 103 (see the waveform of FIG. 1d). Receiving antenna 106 then receives energy radiated by 103 via the direct path 107 and also by multiple reflection paths, one of which is typically depicted by the sum of paths 108 and 109.

It will be realized of course, that such multiple reflections as would be normal, are produced from the sidewalls of the enclosure, from fixed clutter objects within the enclosure, and also from moving clutter, as well as from intruders which it is desired to detect. The RF path 107 is of course, the shortest, or most direct signal path between antennas 103 and 106 and consequently the signal along path 107 will always arrive first and is referred to as the reference signal. All signals received are passed through a radio frequency amplifier 110 and are detected in a relatively conventional superheterodyne mixer 111.

Thus, down converted signals at the output of mixer 111 include the so-called reference signal having no Doppler component thereon, and any intruder Doppler signal resulting from the mixing or heterodyning action in 111. Since these two signals arriving at the mixer are pseudo-random coded, the amplitude of the Doppler signal out of the mixer 111 will depend on the delay $\Delta R$ between them. This amplitude vs. $\Delta R$ relationship is the autocorrelation function of the code, or range response of the system, and is depicted graphically in FIG. 1e.

As will be more fully understood as this description proceeds, the desired range response is selectable in accordance with the actual rectangular shape to be covered, the variations being obtainable by varying the code clock frequency and appropriately locating the transmitting and receiving antennas. A range response control 112 is depicted on FIG. 1a, this control being capable of varying the frequency of the clock 104. Since the length of the maximized coded word is $Y_bL$ the maximum contained detection range is therefore adjustable as varies with the said clock frequency.

It is to be noted that a typical signal level for the reference signal received at 106 is -50 dBm and for an echo from a human intruder it is on the order of -90 dBm where the antenna spacing is about 300 ft. The gain of the RF amplifier 110 should be on the order of 40 dB to overcome the noise of the mixer 111. The range response shape will always be the same for a 10 stage coder, (i.e., 60 dB rejection at that range corresponding to $\Delta R_b$ for each clock frequency). See FIG. 1e.

The Doppler frequency spectrum resulting from a moving human intruder will have a bandwith centered about the mean Doppler, (approximately one half the mean period). Based on this, the Doppler filter upper cutoff is selected at 40 Hz. The expected maximum mean Doppler shift for the 915 MHz RF carrier is on the order of 28 Hz, corresponding to 20 ft. per second intruder motion in a 300 × 300 ft. area of surveillance. The Doppler filter/amplifier 113 is constructed with selectable gain in order that the threshold circuit 114 is provided with a signal, or rather a receiver response function in accordance with FIG. 1e with a predetermined maximum amplitude characteristic. In this way, the alarm threshold setting (which is a simple amplitude level setting) in 114, can be effected in accordance with the alarm threshold depicted in FIG. 1e. The output of threshold circuit 114 is therefore a straightforward analog alarm signal which can be used to activate any local or remote alarm devices, as desired.

The threshold setting in circuit 114 must be such that the minimum target size contemplated will positively cause an alarm at the maximum useful range, that is, on the edge of the ellipse of coverage. If the typical target on the edge of the covered ellipse is at a range designated $\Delta R_{max}$, the clock code will be adjusted so that the $\Delta R_{max}$ falls on the 20 dB (down) point of the range response, this being the point at which the threshold of 114 is set for a typical size target.

FIGS. 3a and 3b are the plan and elevation views of typical transmitter and receiver locations, respectively, with geometry notations.

Backplate reflectors or baffles are shown at 301 and 302, these affording some tailoring of the coverage ellipse prolate extremities, as will be seen in connection with FIGS. 4a and 4b, subsequently.

FIG. 2a is a diagram similar to FIG. 1a in which like components are identically numbered. FIG. 2a, however, together with FIGS. 2b, 2c and 2d, illustrate the generation of a pseudo-random code with a five stage shift register, operating as coder 105. In the example shown, the bit duration is 20 nanoseconds corresponding to a clock frequency $f_c$ of 50 MHz. The clock pulses depicted in FIG. 2b vis-a-vis the video phase code (FIG. 2c) for modulating the PF transmitted signal phase-coded envelope of FIG. 2d, are largely self-explanatory. In FIG. 2a, the direct signal path 107 to the receiving antenna 106 and mixer 111 are again depicted, along with reflected signal paths 108 and 109, the delay caused by the extra path length along the reflected echo signal path being represented by a variable delay block 203. The Doppler filter can be (functionally) an integrator and is so represented as 113 in FIG. 2a.

To obtain the amplitude of the autocorrelation function at a given fixed time delay (or range), the waveform is delayed by the additional pathlength (of the reflected path compared to the direct path), multiplied by itself and then integrated. FIG. 2e depicts this autocorrelation function for the conditions represented by FIGS. 2a through 2d. Since the code is periodic, the autocorrelation function is also periodic. Because of the non-integral relationship between the various ranges possible within the ellipse and the codeword length, the codes extracted from the direct, or reference signal path and any echo signal path, "slip by" one another, i.e., are effectively asynchronous over a plurality of word periods, so that a periodic autocorrelation function is produced as the intruder moves about within the ellipse.

FIGS. 4a and 4b, and also 5a, 5b and 5c depict some options available in respect to rectangular areas of surveillance of various sizes and aspect ratios. The area of positive detection, as previously indicated, falls within the ellipse in FIGS. 4a and 4b. The use of back plates or baffles (ground plates) behind the transmitting and receiving antennas reduces the area of dipole antenna coverage, as shown. Accodingly, the extended ellipse boundaries outside the contained area can be reduced and the selection of $\Delta R_{max}$, i.e., the difference between direct and reflected paths at the lateral enclosure midpoint, as illustrated, can be selected to make the elliptical area of positive detection tangent to the enclosure sidewalls, as illustrated. It will be realized, of course, thay any point on the ellipse represents the same reflected pathlength between transmitter and receiver, a fact which follows from the basic geometry of an ellipse.

The selection of $\Delta R_{max}$ to cover the configurations of 5a, 5b and 5c are as depicted therein.

Figure 7:
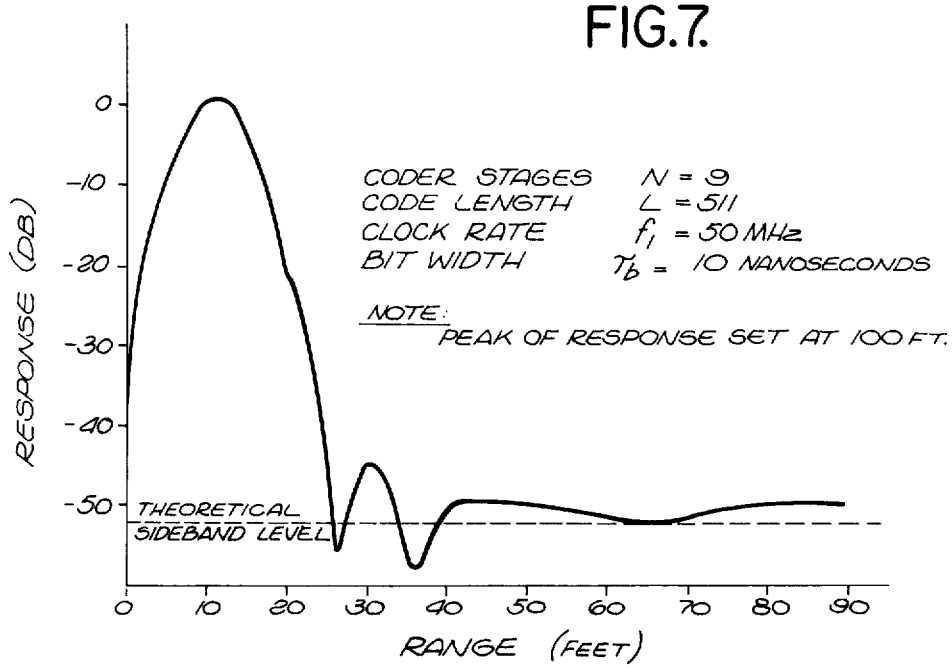
FIG. 7 depicts a typical range response of a system in accordance with the present invention.
Figure 8B:
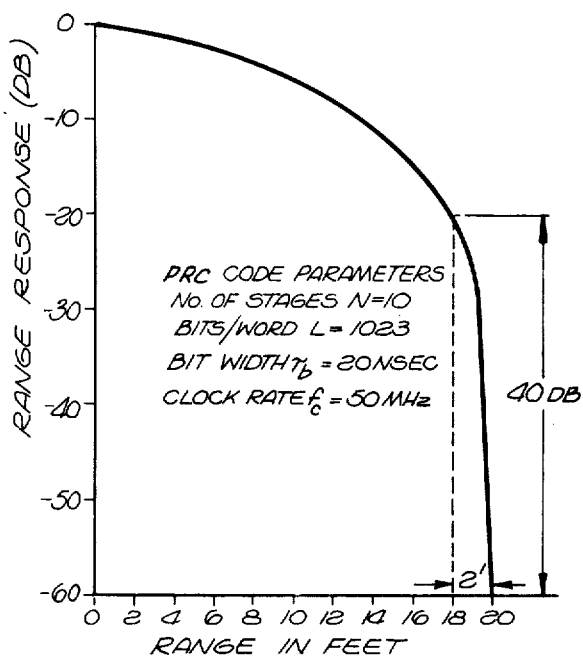
FIGS. 8a and 8b depict a generalized range response curve and a typical specific range response curve for a bi-static pseudo-random radar system as applied to the present invention.
Figure 8A:
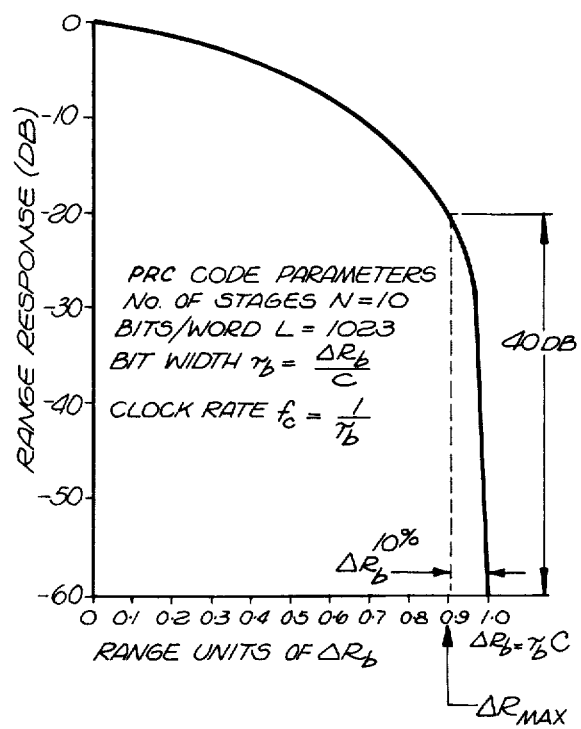

Moving ahead to FIGS. 7, 8a and 8b, response characteristics following from selected parameters as given, are illustrated. In FIG. 8a, the abscissa scale in range units of $\Delta R_b$. It will be recalled that the value of $\Delta R_b$ is graphically defined on FIG. 1e, there always being 60 dBs rejection ($n = 10$) at the range corresponding to $\Delta R_b$ for each clock frequency.

FIG. 8b is essentially the same as FIG. 8a, except with an abscissa scale representing range in feet, rather than the arbitrary range unit scale of unit 8a.

Reffering now to FIG. 6, an arrangement is shown whereby a single transmitter location can serve up to four satellite areas. Assuming that each area is equal to the originally assumed typical area of 90,000 sq. ft., this provides coverage up to 36,000 sq. ft. A single pseudo-random code transmitter equivalent to that depicted in FIG. 1a is shown as block 601, the four transmitting antennas 602, 603, 604 and 605 serve each of the corresponding areas 606, 607, 608 and 609, respectively. Each of these areas has a corresponding receiving antenna and pseudo-random code signal receiver, not depicted geometrically, but it is to be understood that the same type of elliptical area of positive detection is provided in each satellite area, as shown in FIG. 4b. In dividing the 100 milliwatt power into 25 milliwatt radiations from each of 602, 603, 604 and 605 antennas, the signal-to-noise ratio is reduced by 6 dB, however the resulting minimum signal-to-noise ratio of 37 dB still provides a large margin of saftey for substantially 100% probability of detection. The threshold setting level compared to noise should remain at 43 dB, making false alarms due to receiver noise negligible. If the four areas were open to each other in the center, such that a single transmitting antenna could be used, the loss in signal-to-noise at each receiver would also be the aforementioned 6 dB. The processor represented at 610 could simply mix the alarm signals from the four receivers, or could otherwise selectively process receiver outputs (for example, by time-sharing to examine the output of each receiver in turn) under the control of a unit 611, of any desired form for controlling the sequencing.

Once the concepts of the present invention are fully appreciated, modifications and alterations will suggest themselves to those skilled in this art. Accordingly, it is not intended that the scope of the invention should be limited to the embodiments shown and described. The drawings and description are to be taken as typical and illustrative only.

What is claimed is:

1. A system for detecting a moving intruder entering within a predetermined area of coverage, comprising:
    a pair of substantially omni-directional antennas, one for transmitting and the other for receiving, one of said antennas being located at one of the two foci of an ellipse generally defining the boundary of said predetermined area of coverage and the other antenna being located at the other of said foci;
    first means for energizing said transmitting antenna with a pseudo-random coded, bi-phase modulated RF carrier;
    second means responsive to said receiving antenna for receiving signals including direct radiation from said transmitting antenna and delayed signals corresponding to reflections from objects illuminated by said transmitting antenna;
    third means within said second means for autocorrelating said delayed received signals against said direct radiation received signal to produce an autocorrelation output signal having a maximum value when said coded signals reflected from said illuminated objects arrive at said receiving antenna at substantially the same time as the coded signals received by said direct radiation, said autocorrelation output signal decreasing toward zero amplitude as a function of increasing reflected signal delay as the differential delay between said direct and reflected signals at said receiving antenna approaches one bit duration of said code, thereby to produce a response cut-off perimeter which is along the perimeter of said ellipse substantially bounding said predetermined area.
    and a Doppler filter responsive to the output of said third means for passing Doppler signals representative of the velocity of corresponding moving objects within said predetermined area.

2. Apparatus according to claim 1 in which said third means comprises means for providing a product of said delayed and direct signals, the output of which inherently contains frequency components representative of said Doppler signals.

3. Apparatus according to claim 2 in which said third means comprises a superheterodyne mixer, the output of which inherently contains said Doppler signals as a modulation on the received bi-phase modulated signals converted to the IF domain.

4. Apparatus according to claim 1 in which said Doppler filter comprises a low-pass filter having a high end cut-off frequency high enough to accommodate the highest expected Doppler frequency corresponding to the maximum anticipated rate of movement of said intruder.

5. Apparatus according to claim 4 including a threshold circuit providing an output signal whenever the amplitude of the Doppler signal from said Doppler filter exceeds a predetermined level.

6. Apparatus according to claim 1 in which said first means comprises an RF source of generating the RF carrier of said system;
    a bi-phase modulator connected to modulate said carrier, and a pseudo-random coder including a clock circuit connected to control the bit rate of said coder, said coder producing a pseudo-random sequence, for modulating said carrier through said bi-phase modulator;
    said clock circuit being frequency controllable, thereby to control the area within said ellipse and its lateral points of tangency.

7. Apparatus according to claim 6 in which said Doppler filter comprises a low-pass filter having a high end cut-off frequency high enough to accommodate the highest expected Doppler frequency corresponding to the maximum anticipated rate of movement of said intruder.

8. Apparatus according to claim 6 in which integrating means are included and are connected to integrate said Doppler filter output, thereby to avoid generation of an output signal from said threshold circuit corresponding to moving objects within said area of coverage which exhibit reciprocating motion.

* * * * *